(12) United States Patent
Kandaswamy et al.

(10) Patent No.: US 11,799,970 B1
(45) Date of Patent: Oct. 24, 2023

(54) TECHNOLOGIES FOR CLOUD-HYBRID REMOTE BROWSER ISOLATION

(71) Applicant: Whist Technologies, Inc., New York, NY (US)

(72) Inventors: Suriya Kandaswamy, New York, NY (US); Roshan Padaki, New York, NY (US); Karthick Jeyapal, Bangalore (IN); Philippe Noël, Brooklyn, NY (US); Ming Ying, New York, NY (US); Owen M. Niles, New York, NY (US)

(73) Assignee: Whist Technologies, Inc., New York, NY (US)

( * ) Notice: Subject to any disclaimer, the term of this patent is extended or adjusted under 35 U.S.C. 154(b) by 0 days.

(21) Appl. No.: 18/118,913

(22) Filed: Mar. 8, 2023

(51) Int. Cl.
*H04L 67/142* (2022.01)
*H04L 67/141* (2022.01)
*H04L 67/02* (2022.01)

(52) U.S. Cl.
CPC .......... *H04L 67/142* (2013.01); *H04L 67/141* (2013.01); *H04L 67/02* (2013.01)

(58) Field of Classification Search
CPC ...... H04L 67/142; H04L 67/141; H04L 67/02
See application file for complete search history.

(56) References Cited

U.S. PATENT DOCUMENTS

| 10,552,639 | B1* | 2/2020 | Buzbee | G06F 21/6245 |
| 2020/0252413 | A1* | 8/2020 | Buzbee | G06F 21/6281 |
| 2021/0250333 | A1* | 8/2021 | Negrea | G06F 9/547 |

* cited by examiner

*Primary Examiner* — Minh Chau Nguyen
(74) *Attorney, Agent, or Firm* — Barnes & Thornburg LLP

(57) ABSTRACT

Technologies for cloud-hybrid remote browsing include a client device in communication with a cloud server. The client device opens browser tab in a web browser and opens a secure connection with a cloud server. The cloud server generates tab content for a web site with a browser engine and streams the tab content to the client device. The client device renders the tab content in the browser tab. The tab content may be serialized drawing commands or bitmap data. The client device may execute certain browser tabs locally, and may determine a hybrid tab strategy that indicates whether to execute each browser tab locally or with the cloud server. The hybrid tab strategy may be based on available computing resources of the client device. Other embodiments are described and claimed.

18 Claims, 6 Drawing Sheets

TECHNOLOGIES FOR CLOUD-HYBRID REMOTE BROWSER ISOLATION

BACKGROUND

Web browsers are a popular application for many interactive computer systems. Current web browsers are capable of executing advanced web applications, which may include complicated graphics, computations, or other resource-intensive operations. Typical web browsers may be executed natively by a computing device and thus may present a potential attack surface for malware. Certain systems may reduce local security risks by executing a web browser remotely within an operating system that is also executed remotely using a remote desktop technology such as Virtual Network Computing (VNC), Remote Desktop Protocol (RDP), or another remote desktop technology. Similarly, certain systems may execute a remote web browser on top of a local web browser using remote browser isolation (RBI) technology.

SUMMARY

According to one aspect of the disclosure, a computing device for hybrid web execution comprises a tab manager, a cloud connector, and a display engine. The tab manager is to open a first browser tab in a web browser of the computing device. The cloud connector to open a secure connection with a cloud server and stream tab content for the first browser tab from the cloud server via the secure connection. The display engine is to render the tab content in the first browser tab.

In an embodiment, to stream the tab content comprises to receive the tab content by a native browser engine of the computing device; and to render the tab content comprises to render the tab content by the native browser engine. In an embodiment, to stream the tab content comprises to receive bitmap data indicative of the tab content. In an embodiment, to stream the tab content comprises to receive serialized drawing commands indicative of the tab content; and to render the tab content comprises to deserialize the serialized drawing commands to generate drawing commands. In an embodiment, to render the tab content further comprises to dispatch the drawing commands to a graphics subsystem of the computing device.

In an embodiment, the computing device further comprises a session manager to synchronize a session state of the first browser tab with the cloud server. To stream the tab content comprises to stream the tab content after synchronization of the session state. In an embodiment, to synchronize the session state comprises to synchronize the session state via a second secure connection established between a browser extension of the computing device and the cloud server.

In an embodiment, the tab manager is further to open a second browser tab in the web browser of the computing device, and execute the second browser tab locally with the computing device. In an embodiment, the tab manager is further to determine a hybrid tab strategy, wherein the hybrid tab strategy indicates whether to execute each browser tab locally with the computing device or with the cloud server. To execute the second browser tab locally comprises to execute the second browser tab locally in response to a determination of the hybrid tab strategy; and to stream the tab content for the first browser tab comprises to stream the tab content for the first browser tab in response to the determination of the hybrid tab strategy. In an embodiment, to determine the hybrid tab strategy comprises to receive a user input indicative of the hybrid tab strategy. In an embodiment, to determine the hybrid tab strategy comprises to evaluate a predetermined policy of the computing device. In an embodiment, to determine the hybrid tab strategy comprises to evaluate a computing resource level of the computing device.

According to another aspect, a computing device for hybrid web execution comprises a client connector and a content manager. The client connector is to open a secure connection with a client device. The content manager is to generate tab content for a web site with a browser engine of the computing device and stream the tab content to the client device via the secure connection.

In an embodiment, the content manager is further to isolate execution of the browser engine. In an embodiment, to isolate the execution of the browser engine comprises to isolate the execution with virtualization, container isolation, or process isolation.

In an embodiment, to stream the tab content comprises to transmit bitmap data indicative of the tab content. In an embodiment, to generate the tab content comprises to generate a plurality of drawing commands indicative of the tab content and serialize the plurality of drawing commands to generate serialized drawing commands; and to stream the tab content comprises to transmit the serialized drawing commands.

In an embodiment, the computing device further comprises a session manager to synchronize a session state associated with the web site with the client device. To stream the tab content comprises to stream the tab content after synchronization of the session state. In an embodiment, to synchronize the session state comprises to synchronize the session state via a second secure connection established between the computing device and the client device.

According to another aspect, a method for hybrid web execution comprises opening, by a computing device, a secure connection with a cloud server; opening, by the computing device, a first browser tab in a web browser of the computing device; streaming, by the computing device, tab content for the first browser tab from the cloud server via the secure connection; and rendering, by the computing device, the tab content in the first browser tab.

In an embodiment, streaming the tab content comprises receiving the tab content by a native browser engine of the computing device; and rendering the tab content comprises rendering the tab content by the native browser engine. In an embodiment, streaming the tab content comprises receiving bitmap data indicative of the tab content. In an embodiment, streaming the tab content comprises receiving serialized drawing commands indicative of the tab content; and rendering the tab content comprises deserializing the serialized drawing commands to generate drawing commands. In an embodiment, rendering the tab content further comprises dispatching the drawing commands to a graphics subsystem of the computing device.

In an embodiment, the method further comprises synchronizing, by the computing device, a session state of the first browser tab with the cloud server. Streaming the tab content comprises streaming the tab content after synchronizing the session state. In an embodiment, synchronizing the session state comprises synchronizing the session state via a second secure connection established between a browser extension of the computing device and the cloud server.

In an embodiment, the method further comprises opening, by the computing device, a second browser tab in the web browser of the computing device; and executing, by the computing device, the second browser tab locally with the computing device. In an embodiment, the method further comprises determining, by the computing device, a hybrid tab strategy, wherein the hybrid tab strategy indicates whether to execute each browser tab locally with the computing device or with the cloud server. Executing the second browser tab locally comprises executing the second browser tab locally in response to determining the hybrid tab strategy; and streaming the tab content for the first browser tab comprises streaming the tab content for the first browser tab in response to determining the hybrid tab strategy. In an embodiment, determining the hybrid tab strategy comprises receiving a user input indicative of the hybrid tab strategy. In an embodiment, determining the hybrid tab strategy comprises evaluating a predetermined policy of the computing device. In an embodiment, determining the hybrid tab strategy comprises evaluating a computing resource level of the computing device.

According to another aspect, a method for hybrid web execution comprises opening, by a computing device, a secure connection with a client device; generating, by the computing device, tab content for a web site with a browser engine of the computing device; and streaming, by the computing device, the tab content to the client device via the secure connection.

In an embodiment, the method further comprises isolating, by the computing device, execution of the browser engine. In an embodiment, isolating execution of the browser engine comprises isolating execution with virtualization, container isolation, or process isolation.

In an embodiment, streaming the tab content comprises transmitting bitmap data indicative of the tab content. In an embodiment, generating the tab content comprises generating a plurality of drawing commands indicative of the tab content and serializing the plurality of drawing commands to generate serialized drawing commands; and streaming the tab content comprises transmitting the serialized drawing commands.

In an embodiment, the method further comprises synchronizing, by the computing device, a session state associated with the web site with the client device. Streaming the tab content comprises streaming the tab content after synchronizing the session state. In an embodiment, synchronizing the session state comprises synchronizing the session state via a second secure connection established between the computing device and the client device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
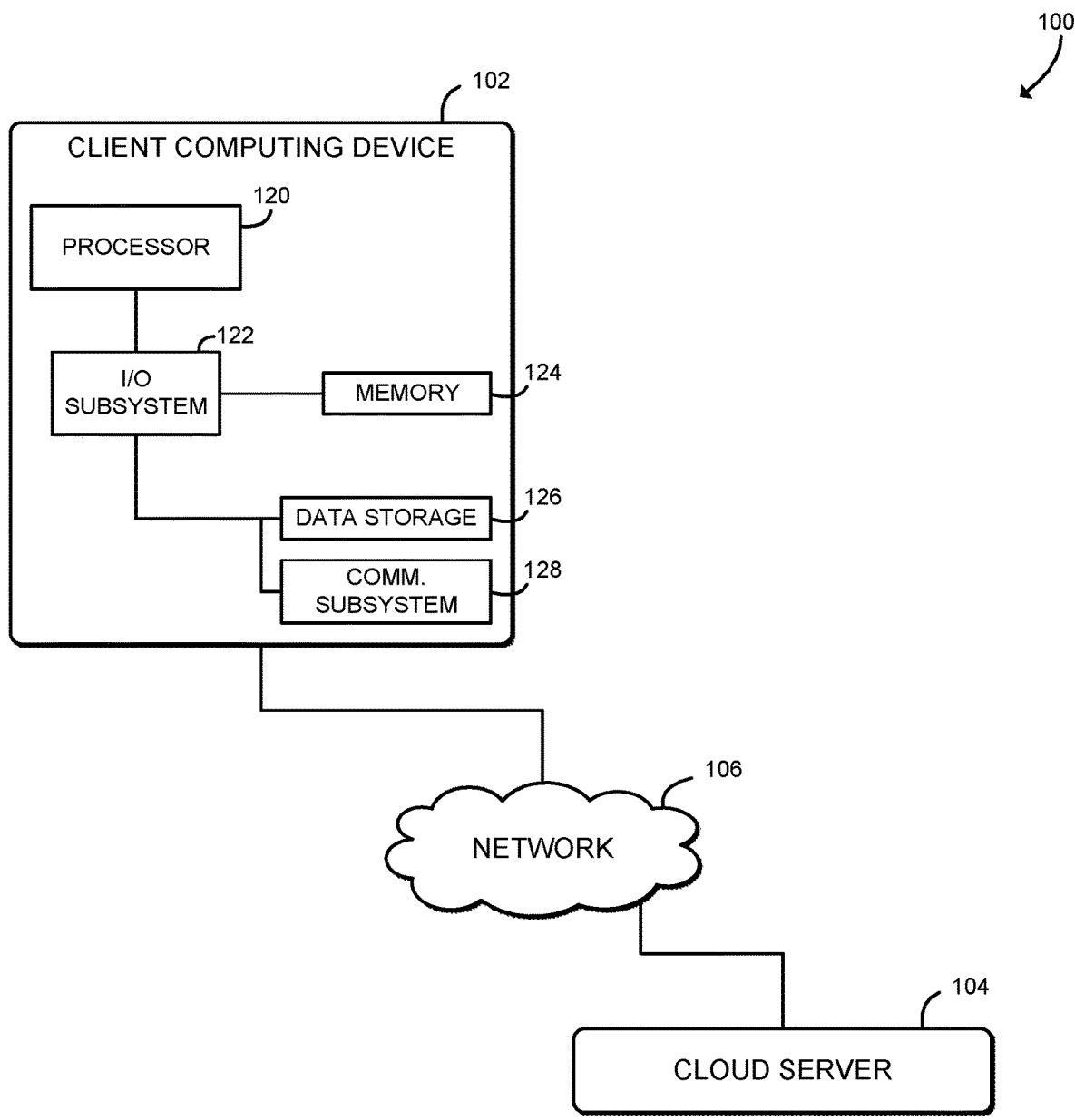
FIG. 1 is a simplified block diagram of at least one embodiment of a system for cloud-hybrid remote browser isolation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for cloud-hybrid remote browsing includes one or more client computing devices 102 and a cloud server 104 in communication over a network 106. In use, each client device 102 executes a web browser with multiple tabs. On a per-tab basis, the client device 102 may execute browser tabs locally using local resources of the client device 102, or the client device 102 may offload execution of the browser tab to the cloud server 104. The cloud server 104 streams content for remote browser tabs to the client device 102 via a secure connection, and the web browser of the client device 102 renders the tab content for display. The client device 102 may dynamically execute tabs locally or remotely with the cloud server 104 based on user selections, administrative policies, local resource consumption, or other strategies. Accordingly, the system 100 may allow a user to seamlessly offload resource-intensive browser tabs to the cloud server 104 in order to take advantage of additional processor, memory, network, or other computation resources available at the cloud server 104. This may improve performance of the client device 102 while also improving the user experience compared to existing remote desktop or remote browser isolation techniques. Additionally, the system 100 may improve security for the client device 102 by isolating execution of the remote browser tab with the cloud server 104 while providing a seamless tabbed browsing user experience, which is an improvement over typical remote browser isolation technology.

Each client computing device 102 or client device 102 may be embodied as any type of device capable of performing the functions described herein. For example, the client computing device 102 may be embodied as, without limitation, a desktop computer, a laptop computer, a tablet computer, a smartphone, a consumer electronic device, a workstation, a server, a rack-mounted server, a blade server, a network appliance, a web appliance, a distributed computing system, a multiprocessor system, and/or any other computing device capable of performing the functions described herein. As shown in FIG. 1, the illustrative client computing device 102 includes a processor 120, an I/O subsystem 122, memory 124, a data storage device 126, and communication circuitry 128. Of course, the client computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the client computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the client computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the client computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the client computing device 102 may be embodied as any communication circuit, device, or collection thereof, capable of enabling communications between the client computing device 102, the cloud server 104, and/or other remote devices. The communication circuitry 128 may be configured to use any one or more communication technology (e.g., wireless or wired communications) and associated protocols (e.g., Ethernet, Bluetooth®, Wi-Fi®, WiMAX, etc.) to effect such communication.

The cloud server 104 is configured to execute remote browser tabs and otherwise perform the functions described herein. Accordingly, the cloud server 104 may be embodied as any type of computation or computer device capable of performing the functions described herein, including, without limitation, a server, a rack-mounted server, a blade server, a network appliance, a web appliance, a distributed computing system, a desktop computer, a laptop computer, a notebook computer, a tablet computer, a mobile computing device, a wearable computing device, a multiprocessor system, a processor-based system, and/or a consumer electronic device. Thus, the cloud server 104 includes components and devices commonly found in a server or similar computing device, such as a processor, an I/O subsystem, a memory, a data storage device, and/or communication circuitry. Those individual components of the cloud server 104 may be similar to the corresponding components of the client computing device 102, the description of which is applicable to the corresponding components of the cloud server 104 and is not repeated herein so as not to obscure the present disclosure. Additionally, in some embodiments, the cloud server 104 may be embodied as a "virtual server" formed from multiple computing devices distributed across the network 106 and operating in a public or private cloud. Accordingly, although the cloud server 104 is illustrated in FIG. 1 as embodied as a single computing device, it should be appreciated that the cloud server 104 may be embodied as multiple devices cooperating together to facilitate the functionality described below.

As discussed in more detail below, the client computing device 102 and the cloud server 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), and/or a publicly-accessible, global network such as the Internet. As such, the network 106 may include any number of additional devices, such as additional computers, routers, and switches, to facilitate communications among the devices of the system 100.

Figure 2:
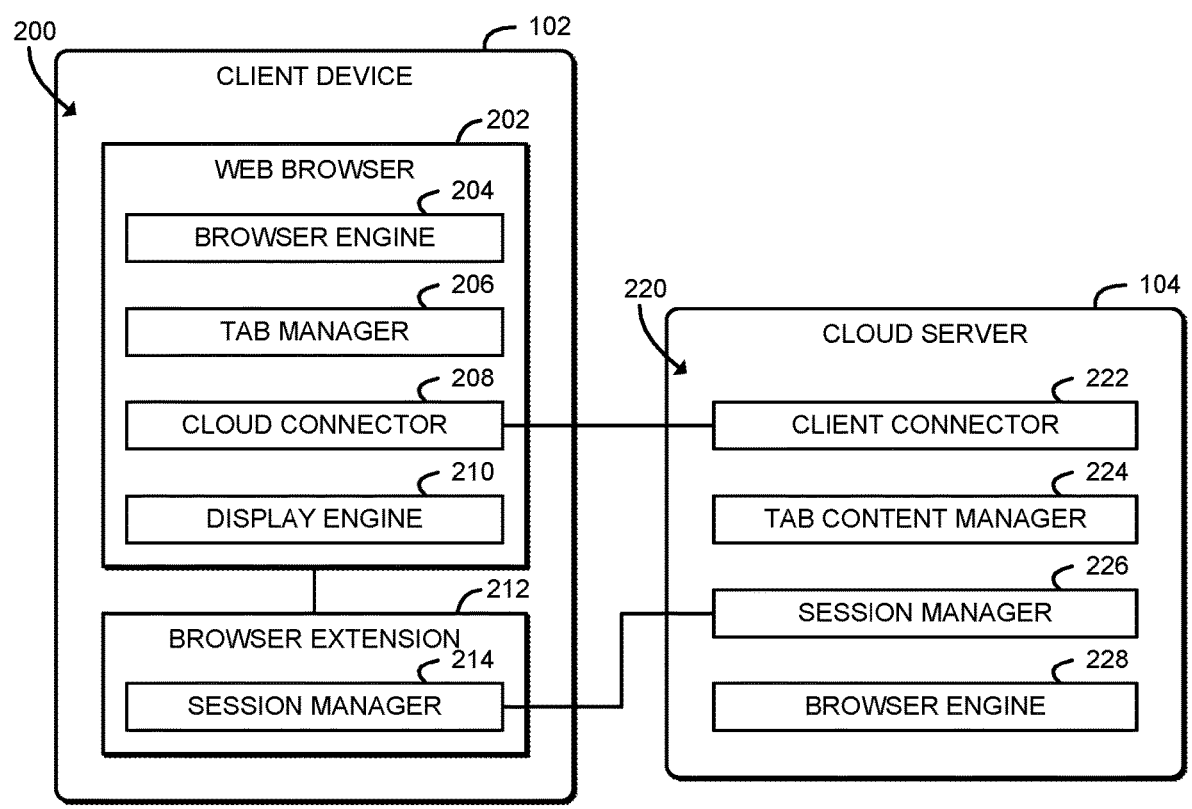
FIG. 2 is a simplified block diagram of various environments that may be established by the system of FIG. 1.

Referring now to FIG. 2, in the illustrative embodiment, the client computing device 102 establishes an environment

200 during operation. The illustrative environment 200 includes a web browser 202 and a browser extension 212. The web browser 202 includes a browser engine 204, a tab manager 206, a cloud connector 208, and a display engine 210, and the browser extension 212 includes a session manager 214. The various components of the environment 200 may be embodied as hardware, firmware, software, or a combination thereof. As such, in some embodiments, one or more of the components of the environment 200 may be embodied as circuitry or a collection of electrical devices (e.g., web browser 202 circuitry, browser engine circuitry 204, tab manager circuitry 206, cloud connector circuitry 208, display engine circuitry 210, browser extension 212 circuitry, and/or session manager circuitry 214). It should be appreciated that, in such embodiments, one or more of those components may form a portion of the processor 120, the I/O subsystem 122, and/or other components of the client computing device 102.

The web browser 202 may be embodied as an interactive application for interacting with web servers or other remote hosts. The web browser 202 may provide a tabbed content area in which HTML, JavaScript, cascading style sheets (CSS), WebGL, or other web content is displayed. A browser engine 204 may parse, style, execute, or otherwise process the web content. Accordingly, the browser engine 204 may include one or more subcomponents, such as a HTML parser, a JavaScript engine, a layout engine, and/or other components. A user may interact with the web browser 202 through the tabbed content area as well as one or more other user interface controls such as menus, toolbars, icons, and other controls. The web browser 202 further includes an extensibility system by which one or more browser extensions, plugins, or other code modules may be loaded and executed in cooperation with the web browser 202. Illustratively, the web browser 202 is based on Brave®; in other embodiments the web browser 202 may be based on or otherwise embodied as Chromium, Google® Chrome™, Mozilla® Firefox®, Apple® Safari®, Microsoft Edge®, or any other web browser.

The tab manager 206 is configured to open one or more browser tabs in the web browser 202 of the client device 102. Each browser tab may be executed locally with the web browser 202 or may be executed remotely, in the cloud by the cloud server 104 as described further below. In some embodiments, the tab manager 206 is further configured to determine a hybrid tab strategy that indicates whether to execute each browser tab locally with the client device 102 or with the cloud server 104. The hybrid tab strategy may be determined by receiving user input indicative of the hybrid tab strategy, evaluating a predetermined policy of the client device 102, or evaluating a computing resource level of the client device 102.

The cloud connector 208 is configured to open a secure connection with the cloud server 104 and to stream tab content for one or more browser tabs from the cloud server 104 via the secure connection. Streaming the tab content may include receiving bitmap data indicative of the tab content or serialized drawing commands indicative of the tab content. Streaming the tab content may include receiving the tab content by the native browser engine 204 of the client device 104.

The display engine 210 is configured to render the streamed tab content in a browser tab. Rendering the tab content may include deserializing the serialized drawing commands to generate drawing commands and dispatching the drawing commands to a graphics subsystem of the client device 102. Rendering the tab content may include rendering the tab content by the native browser engine 204.

The browser extension 212 may be embodied as an extension, plugin, executable, or other code module that may be loaded and executed in cooperation with the web browser 202. As shown, the browser extension 212 includes or otherwise establishes the session manager 226. Additionally, although illustrated as being part of an extensible system that includes the web browser 202 and the browser extension 212, it should be understood that in some embodiments the functions of those components may be performed by a monolithic web browser, an application, or any other program executed by the client device 102.

The session manager 214 is configured to synchronize a session state of one or more browser tabs with the cloud server 104. Tab content may be streamed after synchronization of the session state. Synchronizing the session state may include synchronizing the session state via another secure connection established between the browser extension 212 and the cloud server 104.

Still referring to FIG. 2, in the illustrative embodiment, the cloud server 104 establishes an environment 220 during operation. The illustrative environment 220 includes a client connector 222, a content manager 224, a session manager 226, and a browser engine 228. The various components of the environment 220 may be embodied as hardware, firmware, software, or a combination thereof. As such, in some embodiments, one or more of the components of the environment 220 may be embodied as circuitry or a collection of electrical devices (e.g., client connector circuitry 222, content manager circuitry 224, session manager circuitry 226, and/or browser engine circuitry 228). It should be appreciated that, in such embodiments, one or more of those components may form a portion of the processor, the I/O subsystem, and/or other components of the cloud server 104.

The browser engine 228 may be embodied as a non-interactive component capable of processing web content such as HTML, JavaScript, WebGL, or other web content. For example, the browser engine 228 may be embodied as a headless or otherwise embedded browser engine based on Chromium, Gecko, Trident, or another browser engine component or components. Additionally or alternatively, in some embodiments the browser engine 228 may be included in or otherwise executed with a traditional interactive web browser such as Brave, Chromium, Chrome, Firefox, Safari, Edge, or any other web browser.

The client connector 222 is configured to open a secure connection with a client device 102. The content manager 224 is configured to generate tab content for a web site with the browser engine 228. The content manager 224 may be further configured to isolate execution of the browser engine 228. Execution of the browser engine 228 may be isolated with virtualization, container isolation, or process isolation. The content manager 224 is further configured to stream the tab content to the client device 102 via the secure connection. Streaming the tab content may include transmitting bitmap data indicative of the tab content; or generating drawing commands indicative of the tab content, serializing the drawing commands, and transmitting the serialized drawing commands to the client device 102.

The session manager 226 is configured to synchronize a session state associated with the web site with the client device 102. The tab content may be streamed after synchronization of the session state. Synchronizing the session state may include synchronizing the session state via another secure connection established between the cloud server 104 and the client device 102.

Figure 3:
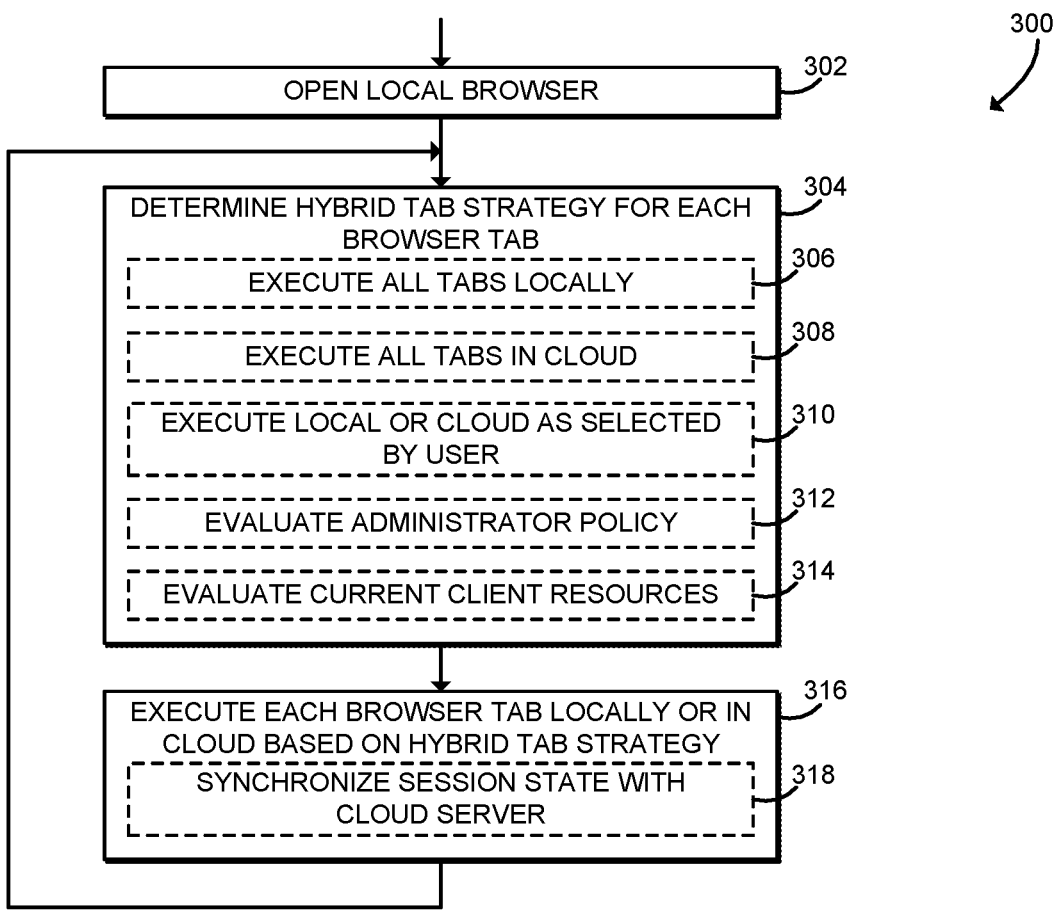
FIG. 3 is a simplified flow diagram of at least one embodiment of a method for determining a hybrid cloud tab strategy that may be executed by a client computing device of FIGS. 1 and 2.

Referring now to FIG. 3, in use, a client device 102 may execute a method 300 for determining a hybrid cloud tab strategy. It should be appreciated that, in some embodiments, the operations of the method 300 may be performed by one or more components of the environment 200 of the client device 102 as shown in FIG. 2. The method 300 begins with block 302, in which the client device 102 opens a local web browser 202. As described above, the web browser 202 is an interactive application for interacting with web servers or other remote hosts, and includes a tabbed user interface. A user may command the web browser to load content associated with one or more web sites, for example by entering a web address, selecting a hyperlink, selecting a bookmark, or otherwise navigating to the selected website. The tabbed user interface allows the browser 202 to execute content for multiple such web sites concurrently or otherwise contemporaneously, and allows a user to select a currently active tab from available tabs. The currently active tab may be displayed over other tabs or the user may be otherwise allowed to interact with content of the currently active tab.

In block 304, the client device 104 determines a hybrid tab strategy for each browser tab. The hybrid tab strategy indicates whether a tab should be executed locally by the web browser 202 (i.e., using the browser engine 204) or that tab should be executed remotely in the cloud by the cloud server 104. The client device 104 may determine a hybrid tab strategy that is applicable to all tabs executed by the web browser 202, to a group of tabs executed by the browser 202, and/or to each tab individually. The determination of the hybrid tab strategy may be based on one or more user inputs, policies, configuration files, operating conditions, or other parameters.

In some embodiments, in block 306 the client device 102 may determine to execute all tabs locally. Those tabs may be executed by the browser engine 204 and thus may consume one or more resources of the client device 102 such as processor time, memory, network bandwidth, energy (e.g., battery power), or other local resources. In some embodiments, in block 308 the client device 102 may determine to execute all tabs remotely in the cloud by the cloud server 104. In those embodiments, each tab may consume fewer (or no) resources of the client device 102 as compared to local execution of the tab.

In some embodiments, in block 310, the client device 102 may selectively execute browser tabs locally or in the cloud as selected by the user of the client device 102. For example, in some embodiments the web browser 202 may include a button, a menu item, a shortcut combination, or other user control that, when selected by the user, instructs the client device 102 to execute a particular tab in the cloud. In some embodiments, the user may select the tabs for remote execution interactively or using other techniques, for example based on one or more configuration files. In some embodiments, in block 312 the client device 102 may evaluate an administrator policy to determine a hybrid tab strategy for a particular browser tab. The administrator policy may include one or more predetermined rules that, when evaluated, indicate whether the tab should be executed locally or in the cloud. For example, the administrator policy may include one or more whitelists, blacklists, or other lists of known websites and/or web applications that are required to be executed remotely and/or prohibited from being executed remotely. As another example, the administrator policy may include one or more security policies that, when evaluated, determine whether a website should be executed locally or in the cloud.

In some embodiments, in block 314 the client device 102 may evaluate current client resources to determine whether to execute a tab locally or in the cloud. When a browser tab consumes a large amount of client resources (e.g., above a predetermined threshold amount or proportion), the client device 102 may select that tab for cloud execution. For example, when a browser tab consumes a large amount of memory or a large amount of processor time, the client device 102 may offload that tab to the cloud server 104 for execution.

Figure 4:
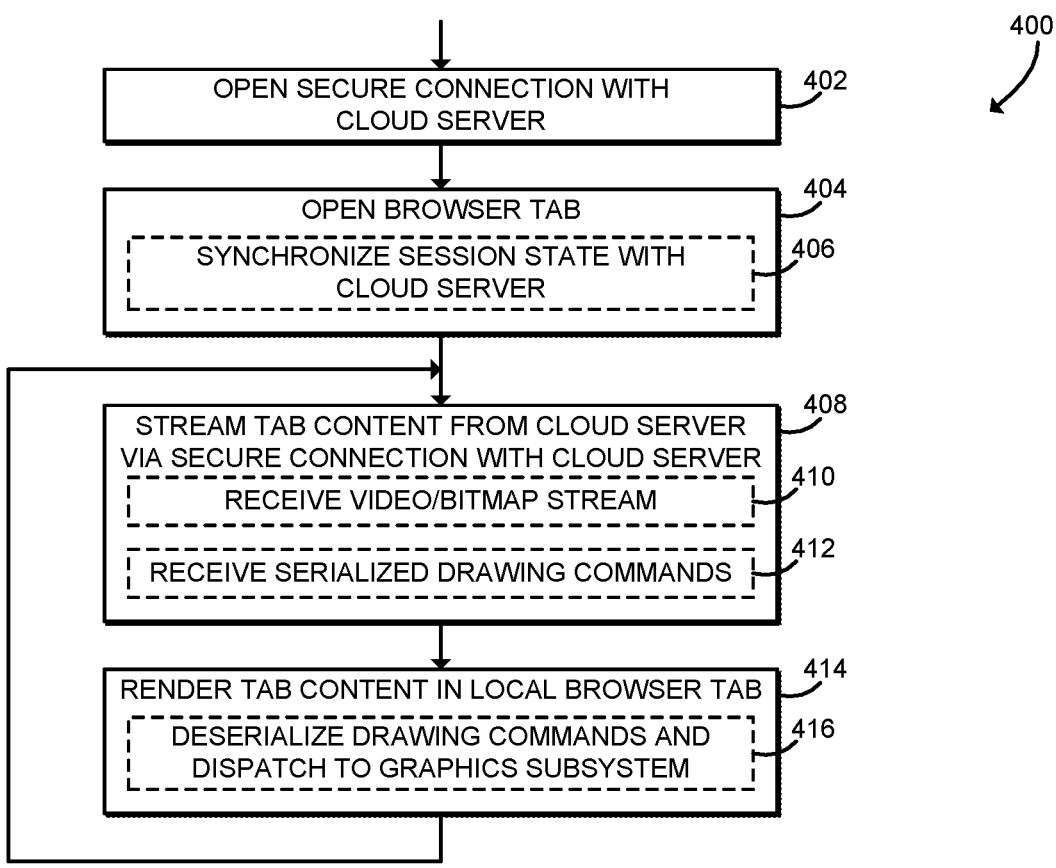
FIG. 4 is a simplified flow diagram of at least one embodiment of a method for executing hybrid cloud tabs that may be executed by the client computing device of FIGS. 1 and 2.
Figure 5:
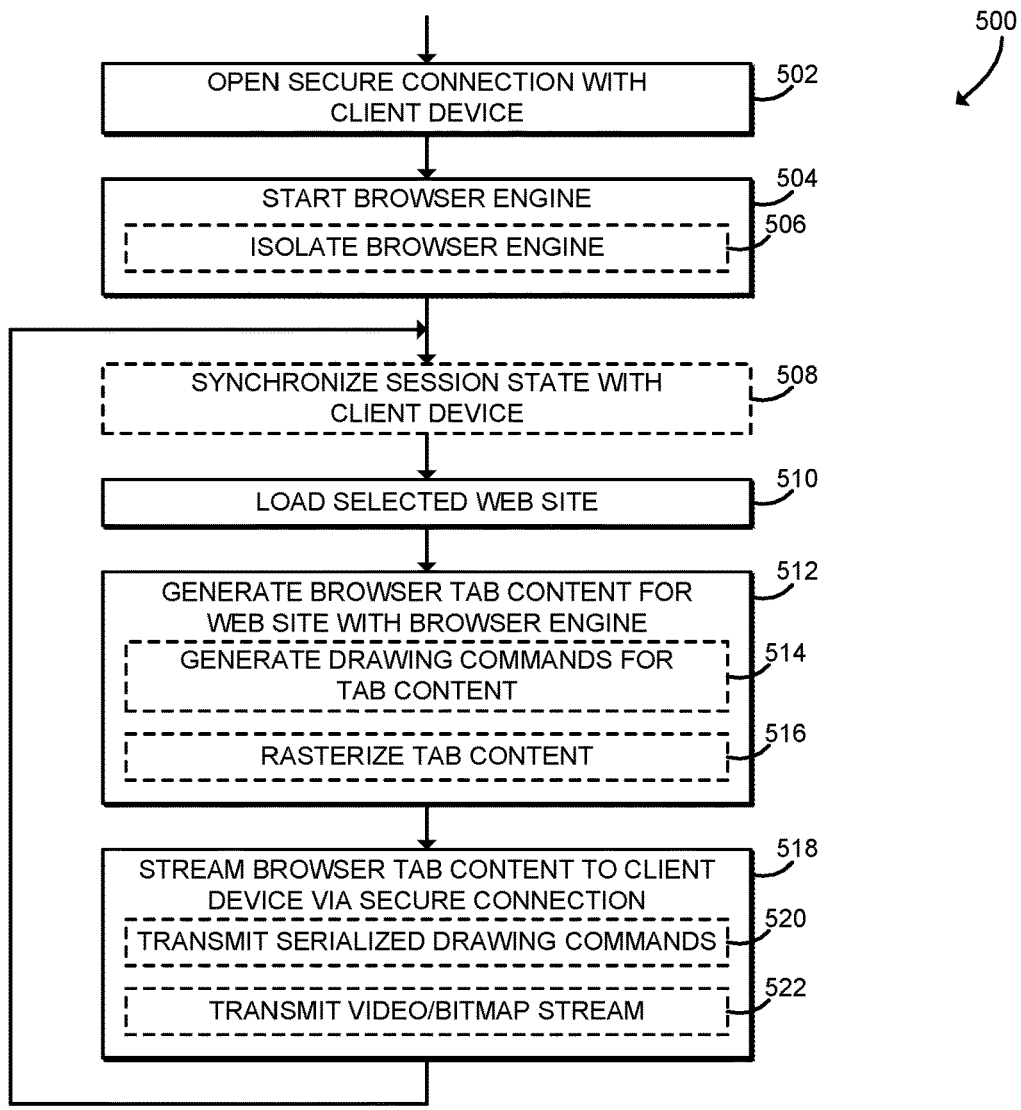
FIG. 5 is a simplified flow diagram of at least one embodiment of a method for executing hybrid cloud tabs that may be executed by a cloud server of FIGS. 1 and 2.

In block 314, the client device 102 executes each browser tab locally or in the cloud with the cloud server 104 based on the hybrid tab strategy determined as described above in connection with block 304. Potential embodiments of methods for executing the tabs remotely are shown in FIGS. 4 and 5 and described further below. In some embodiments, in block 318 the client device 102 may synchronize session state for one or more cloud tabs with the cloud server 104. Synchronizing the session state may include transferring any connection state, user interface state, cookies, browsing history, saved data, or other data indicative of the state of the user's current browsing session. By synchronizing the session state, the client device 102 may allow a user to continue interacting with a web site or other web application as execution of the browser tab moves from the client device 102 to the cloud server 104 and/or from the cloud server 104 to the client device 102. In some embodiments, session state may be synchronized by a browser extension 212 configured to operate in conjunction with the browser 202. After executing each browser tab according to the hybrid tab strategy, the method 300 loops back to block 304, in which the client device 102 may dynamically update or otherwise modify the hybrid tab strategy and otherwise continue to execute the browser tabs.

Referring now to FIG. 4, in use, a client device 102 may execute a method 400 for executing hybrid cloud tabs. It should be appreciated that, in some embodiments, the operations of the method 400 may be performed by one or more components of the environment 200 of the client device 102 as shown in FIG. 2. The method 400 begins with block 402, in which the client device 102 opens a secure connection with the cloud server 104. The secure connection may be embodied as an encrypted TCP/IP connection or other encrypted network connection between the client device 102 and the cloud server 104.

In block 404, the client device 102 opens a browser tab. As described above, the browser tab allows the user to interact with web content for a particular web site or other web application. In connection with opening the browser tab, the user may command the web browser 202 to load content associated with one or more web sites in the browser tab, for example by entering a web address, selecting a hyperlink, selecting a bookmark, or otherwise navigating to the selected website. In some embodiments, in block 406 the client device 102 may synchronize session state for the browser tab with the cloud server 104. As described above, synchronizing the session state may include transferring any connection state, user interface state, cookies, browsing history, saved data, or other data indicative of the state of the user's current browsing session. By synchronizing the session state, the client device 102 may allow a user to continue interacting with a web site or other web application as execution of the browser tab moves from the client device 102 to the cloud server 104. As described above, in some embodiments, the session state may be synchronized by the browser extension 212 configured to operate in conjunction with the browser 202. In those embodiments, the browser extension 212 may establish an additional secure connection to the cloud server 104 in order to synchronize session state.

In block 408, the client device 102 streams tab content from the cloud server 104 via the secure connection with the cloud server 104 that was established as described above in connection with the block 402. The tab content 104 may include visual, audio, and/or other data indicative of the web site or other web application being executed by the browser tab. As described further below in connection with FIG. 5, the cloud server 104 generates the tab content for the browser tab, for example by executing the web site or other web application using an independent browser engine. Accordingly, the tab content may be received by the client device 102 without requiring HTML parsing, JavaScript execution, or other local execution by the browser engine 204. Additionally, in some embodiments the streamed tab content may be received directly by the native browser engine 204 without additional web processing. For example, in the illustrative embodiment, the tab content is received by a native code module of the browser engine 204 (e.g., implemented in C++) without requiring execution or interpretation by a JavaScript engine or other scripting layer executed by the browser engine 204. This native execution may reduce computational resources (e.g., processor time and memory) required for execution of the browser tab. In addition to receiving streamed tab content, the client device 102 may also transmit data back to the client server 104. For example, the client device 102 may transmit user interactions (e.g., hovers, taps, clicks, keypresses, and/or other user interaction events) back to the cloud server 104 in order to enable interactive browsing.

The tab content may be received in one or more predetermined or dynamically selected data formats. In some embodiments, in block 410 the client device 102 may receive the tab content as a video or bitmap stream. For example, the client device 102 may receive an H.264 compressed video stream or other compressed video stream. In some embodiments, in block 412, the client device 102 may receive the tab content as serialized drawing commands (e.g., vector drawing primitives such as draw rectangle, circle, path, text, or other computer graphics drawing commands). For example, the client device 102 may receive serialized Skia commands. The drawing commands may be generated by the browser engine 228 of the cloud server 104 as described further below. Of course, other drawing commands such as PostScript, Cairo, or other drawing commands issued to a canvas may be used in other embodiments.

In block 414, the client device 102 renders the streamed tab content in the local browser tab. The client device 102 may, for example, display the streamed tab content in a window or other user control associated with the browser tab and displayed by the client device 102. In some embodiments, the client device 102 may write the tab content directly to a canvas, a framebuffer, a compositor, a display engine, or otherwise render the content. For example, when the tab content includes bitmap or video data, the client device 102 may display the bitmap content directly. In some embodiments, in block 416, the client device 102 deserializes drawing commands and dispatches the drawing commands to a graphics subsystem. For example, the client device 102 may dispatch such drawing commands to a graphics processing unit (GPU) or other graphics accelerator of the client device 102. After being dispatched, the client device 102 may render, composite, or otherwise generate graphical output data for the drawing commands. In some embodiments, the client device 102 may use different rendering techniques for different types of tab content and/or different parts (e.g., tiles) of the tab content. For example, in a browser tab including text, line art, and bitmapped graphics or video, the client device 102 may render one or more of the line art or text using serialized drawing commands and the bitmapped graphics or video using streamed video data. After rendering the streamed content, the method 400 loops back to block 408, in which the client device 102 continues to stream and render tab content from the cloud server 104.

Referring now to FIG. 5, in use, the client server 104 may execute a method 500 for executing hybrid cloud tabs. It should be appreciated that, in some embodiments, the operations of the method 500 may be performed by one or more components of the environment 220 of the cloud server 104 as shown in FIG. 2. The method 500 begins with block 502, in which the cloud server 104 opens a secure connection with a client device 102. As described above, the secure connection may be embodied as an encrypted TCP/IP connection or other encrypted network connection between the client device 102 and the cloud server 104.

In block 504, the cloud server 104 starts a browser engine 228. As described above, the browser engine 228 may be embodied as a non-interactive component capable of processing web content such as HTML, JavaScript, WebGL, or other web content. For example, the browser engine 228 may be embodied as a headless or otherwise embedded browser engine based on Chromium, Gecko, Trident, or another browser engine component or components. Additionally or alternatively, in some embodiments the browser engine 228 may be included in or otherwise executed with a traditional interactive web browser such as Brave, Chromium, Chrome, Firefox, Safari, Edge, or any other web browser. In some embodiments, in block 506 the cloud server 104 may isolate the browser engine 228. Isolating the browser engine 228 may prevent malicious software executed by the browser engine 228 or other faults from accessing any data associated with other cloud tabs or other processes executed by the cloud server 104, and may prevent such malware and/or faults from damaging any other component of the cloud server 104. The cloud server 104 may use any appropriate isolation technology to isolate the browser engine 228. For example, the cloud server 104 may use virtualization in order to execute the browser engine 228 in an isolated virtual machine. As another example, the cloud server 104 may execute the browser engine 228 in an isolated container such as a Docker® container. As another example, the cloud server 104 may execute the browser engine 228 using operating system process isolation, sandboxing, or other isolation technologies.

In some embodiments, in block 508 the cloud server 104 may synchronize session state for a browser tab with the client device 102. As described above, synchronizing the session state may include transferring any connection state, user interface state, cookies, browsing history, saved data, or other data indicative of the state of the user's current browsing session. By synchronizing the session state, the cloud server 104 may allow a user to continue interacting with a web site or other web application as execution of the browser tab moves from the client device 102 to the cloud server 104. In order to synchronize session state, the cloud server 104 may establish an additional secure connection to the client device 102, for example to communicate with the browser extension 212.

In block 510, the cloud server 104 loads a selected web site. The address, URL, URI, or other locator for the web site may be received from the client device 102. For example, in connection with opening a browser tab, the user may command the web browser 202 to load content associated with one or more web sites in the browser tab, for example by entering a web address, selecting a hyperlink, selecting a bookmark, or otherwise navigating to the selected website. After receiving the address of the selected web site, the cloud server 104 contacts the associated web server and downloads web content for the selected web site. The web content may include HTML and other document data, JavaScript and other scripting data, CSS or other formatting data, images, videos, sound, or other media, and any other resources designated by the web site. The cloud server 104 downloads that web content using network connections and other network resources of the cloud server 104, which may have higher bandwidth and/or capacity as compared to the network resources of the client device 102. For example, in some embodiments the client device 102 may be connected to a mobile network with limited bandwidth and/or metered capacity, whereas the cloud server 104 may be located in a data center with high bandwidth connections available.

In block 512, the cloud server 104 generates browser tab content for the selected web site using the browser engine 228. The browser engine 228 may parse, style, execute, or otherwise process the web content as described above. For example, for a certain web application, the browser engine 228 may parse an associated HTML file and generate a corresponding document object model (DOM) tree. The browser engine 228 may parse multiple associated style sheets and apply visual formatting to elements of the DOM tree. The browser engine 228 may further execute associated scripts that manipulate the DOM tree and/or otherwise perform scripting functions. After generating the DOM tree, the cloud server 104 may perform additional operations to generate browser tab content, such as separating the DOM tree into a layer tree during compositing and generating a draw list for each layer. Those functions are performed using computing resources (e.g., processor time and memory) of the cloud server 104.

In some embodiments, in block 514, the cloud server 104 may generate drawing commands for the browser tab content. As described above, the drawing commands are illustratively drawing commands for the Skia drawing system, and may include vector drawing primitives such as draw rectangle, circle, path, text, or other computer graphics drawing commands. The cloud server 104 may generate drawing commands for part or all of the browser tab content. For example, the cloud server 104 may divide the browser tab into multiple tiles and generate drawing commands for each tile. As another example, the cloud server 104 may identify regions of the browser tab that have changed and generate drawing commands for those changed regions only. In some embodiments, the drawing commands may be generated as part of an out-of-process rasterization (OOP-R) pipeline and may be captured by the cloud server 104 prior to being submitted to a visualization/GPU process. In some embodiments, in block 516 the cloud server 104 may rasterize the tab content. For example, the cloud server 104 may rasterize one or more drawing commands into a bitmap image. In some embodiments, the cloud server 104 may copy or otherwise draw images, video, or other media content to a rasterized format.

In block 518, the cloud server 104 streams browser tab content to the client device 102 via the secure connection. In some embodiments, in block 520, the cloud server 104 transmits serialized drawing commands to the client device 102. As described above, the drawing commands may be generated for an OOP-R process. The drawing commands may be serialized by saving into a linear data format and transmitted via the secure network connection to the client device 102. By transmitting drawing commands as opposed to video or bitmap images, the cloud server 104 may reduce required network bandwidth. In some embodiments, in block 522 the cloud server 104 transmits a video or bitmap image stream to the client device 102. The cloud server 104 may use any technique to transmit rasterized data generated by the browser engine 228. For example, the cloud server 104 may capture video output generated by the browser engine 228, encode the video output to generate compressed video (e.g., using H.264 compression), and transmit the compressed video stream to the client device 102. In some embodiments, the cloud server 104 may transmit browser tab content as both serialized drawing commands and video data, and may select the streaming format dynamically based on browser content. For example, certain text and vector graphics may be transmitted as drawing commands, and certain media files (e.g., images, video, animated images, etc.) may be transmitted as a bitmap stream. Other content such as fonts and images may be transmitted and then cached by the client device 102 or otherwise streamed to the client device 102. After streaming the tab content, the method 500 loops back to block 508, in which the cloud server 104 may continue to synchronize session state and execute the cloud browser tab.

Figure 6:
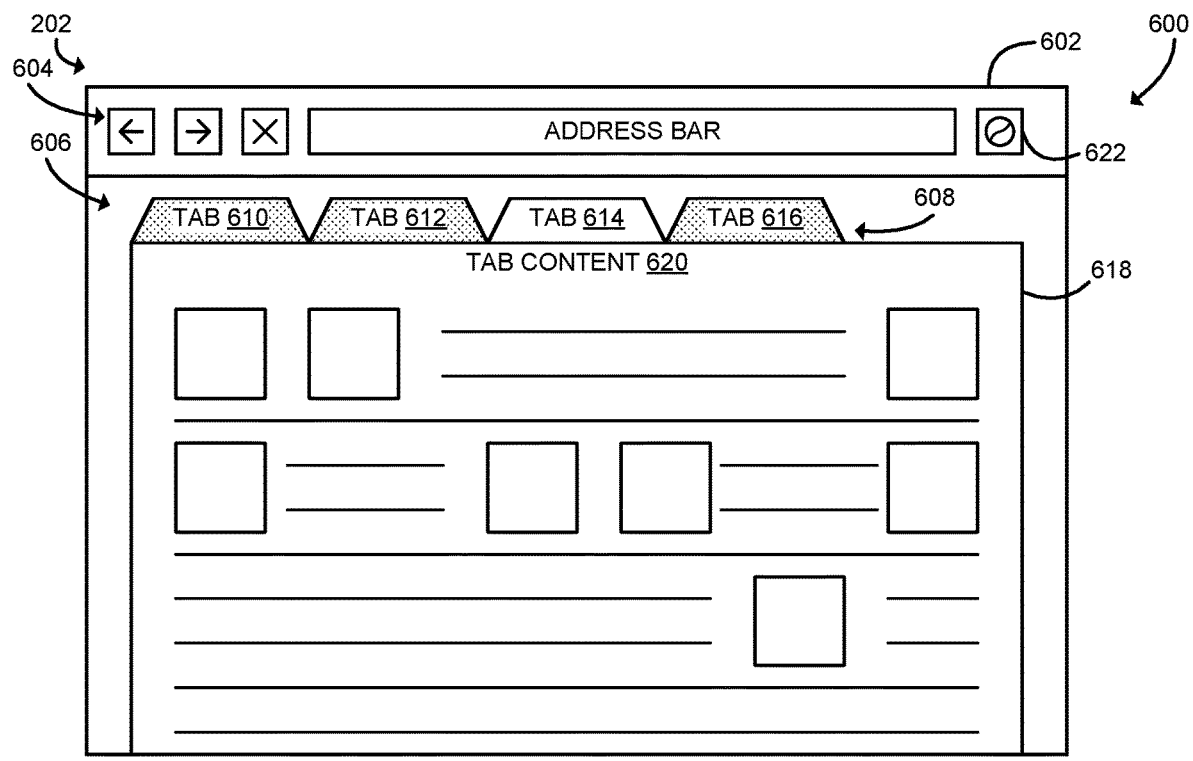
FIG. 6 is a schematic diagram of at least one embodiment of a web browser with hybrid cloud tabs of the client computing device of FIGS. 1 and 2.

Referring now to FIG. 6, diagram 600 illustrates one potential embodiment of a user interface for the web browser 202 of the client device 102. As shown, the web browser 202 may display a main window 602 that includes a toolbar 604 and a tabbed content area 606. The toolbar 604 illustratively includes an address bar and various navigation controls, and may include additional user controls as described further below. In some embodiments, the contents of the toolbar 604 may be user-configurable.

The tabbed content area 606 includes a tab bar 608, which illustratively includes four tabs 610, 612, 614, 616. The tabbed content area 606 further includes a content window 618 which displays tab content 620 for the currently selected tab, which is illustratively the tab 614. A user may select another one of the tabs 610, 612, 616, for example by clicking or tapping on the respective tab, and tab content 620 associated with the newly selected tab may be displayed in the content window 618.

As shown, the toolbar 604 further includes a command button 622. Illustratively, when the user selects the command button 622, for example by clicking or tapping on the command button 622, the client device 102 may offload the currently selected tab (e.g., the illustrative tab 614) to the cloud server 104 for cloud execution. Additionally or alternatively, as described above, in some embodiments the client device 104 may automatically select one or more of the currently loaded tabs for cloud execution, for example based on an administrator policy or based on resource consumption.

Figure 7:
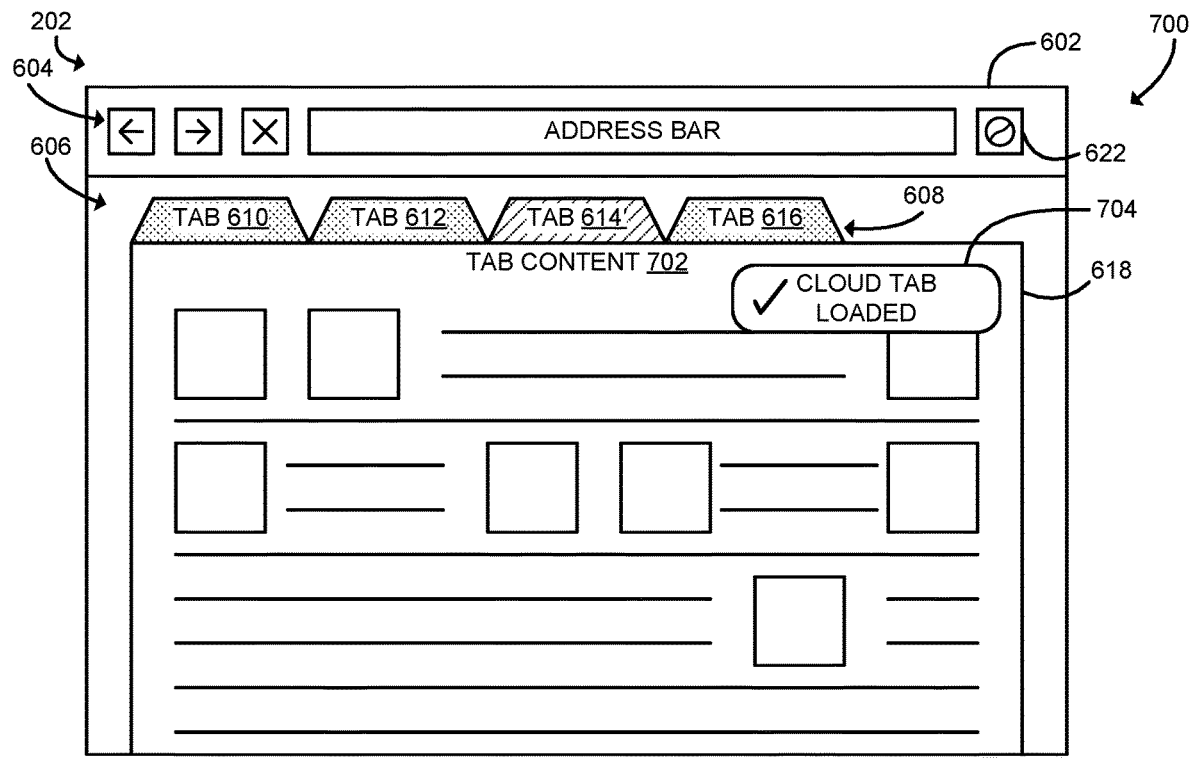
FIG. 7 is a schematic diagram of another embodiment of a web browser with hybrid cloud tabs of the client computing device of FIGS. 1 and 2.

Referring now to FIG. 7, diagram 700 illustrates the user interface for the web browser 202 of the client device 102 when executing a browser tab remotely with the cloud server 104. As shown, similar to the diagram 600 of FIG. 6, the browser 202 includes the main window 602, the toolbar 606, and the tabbed content area 606. As shown, the tab bar 608 indicates that the tab 614' is currently active. As described above, the tab 614' is executed remotely by the cloud server 104. Accordingly, the content window 618 displays tab content 702 associated with the tab 614', which is streamed from the cloud server 104. As shown, the tab content 702 is similar and/or identical in appearance to the tab content 620. Accordingly, the user may continue interacting with the tab content 702 in the same manner as with the tab content 620. As described above, this seamless execution may be facilitated by synchronizing web browser session state between the client device 102 and the cloud server 104.

As shown in FIG. 7, the tab 614' may have a different appearance from the tab 614 of FIG. 6 in order to indicate to the user that the tab content 702 is being executed by the cloud server 104. Additionally, the illustrative embodiment displays a transient notification 704 indicating to the user that the tab 614' has been loaded in the cloud. In some embodiments, the web browser 202 may not visually differentiate or otherwise distinguish cloud tabs from locally executing tabs. In those embodiments, cloud execution of browser tabs may be seamless and/or transparent to the user.

The invention claimed is:

1. A computing device for hybrid web execution, the computing device comprising:
 tab manager circuitry to open a first browser tab in a web browser of the computing device;
 cloud connector circuitry to (i) open a secure connection with a cloud server, and (ii) stream tab content for the first browser tab from the cloud server via the secure connection;
 display engine circuitry to render the tab content in the first browser tab; and
 session manager circuitry to synchronize a session state of the first browser tab with the cloud server via a second secure connection established between a browser extension of the computing device and the cloud server;
 wherein to stream the tab content comprises to stream the tab content after synchronization of the session state.

2. The computing device of claim 1, wherein:
 the tab manager circuitry is further to (i) open a second browser tab in the web browser of the computing device, and (ii) execute the second browser tab locally with the computing device.

3. The computing device of claim 2, wherein:
 the tab manager circuitry is further to determine a hybrid tab strategy, wherein the hybrid tab strategy indicates whether to execute each browser tab locally with the computing device or with the cloud server;
 wherein to execute the second browser tab locally comprises to execute the second browser tab locally in response to a determination of the hybrid tab strategy; and
 wherein to stream the tab content for the first browser tab comprises to stream the tab content for the first browser tab in response to the determination of the hybrid tab strategy.

4. The computing device of claim 3, wherein to determine the hybrid tab strategy comprises to receive a user input indicative of the hybrid tab strategy.

5. The computing device of claim 3, wherein to determine the hybrid tab strategy comprises to evaluate a predetermined policy of the computing device.

6. The computing device of claim 3, wherein to determine the hybrid tab strategy comprises to evaluate a computing resource level of the computing device.

7. The computing device of claim 1, wherein:
 to stream the tab content comprises to receive serialized drawing commands indicative of the tab content; and
 to render the tab content comprises to deserialize the serialized drawing commands to generate drawing commands.

8. The computing device of claim 7, wherein to render the tab content further comprises to dispatch the drawing commands to a graphics subsystem of the computing device.

9. The computing device of claim 1, wherein:
 to stream the tab content comprises to receive the tab content by a native browser engine of the computing device; and
 to render the tab content comprises to render the tab content by the native browser engine.

10. The computing device of claim 1, wherein to stream the tab content comprises to receive bitmap data indicative of the tab content.

11. One or more non-transitory, computer readable storage media comprising a plurality of instructions that in response to being executed cause a computing device to:
 open a secure connection with a cloud server;
 open a first browser tab in a web browser of the computing device;
 stream tab content for the first browser tab from the cloud server via the secure connection;
 render the tab content in the first browser tab; and
 synchronize a session state of the first browser tab with the cloud server via a second secure connection established between a browser extension of the computing device and the cloud server;
 wherein to stream the tab content comprises to stream the tab content after synchronizing the session state.

12. The one or more non-transitory, computer readable storage media of claim 11, further comprising a plurality of instructions that in response to being executed cause the computing device to:
 open a second browser tab in the web browser of the computing device; and
 execute the second browser tab locally with the computing device.

13. The one or more non-transitory, computer readable storage media of claim 12, further comprising a plurality of instructions that in response to being executed cause the computing device to:
 determine a hybrid tab strategy, wherein the hybrid tab strategy indicates whether to execute each browser tab locally with the computing device or with the cloud server;
 wherein to execute the second browser tab locally comprises to execute the second browser tab locally in response to determining the hybrid tab strategy; and
 wherein to stream the tab content for the first browser tab comprises to stream the tab content for the first browser tab in response to determining the hybrid tab strategy.

14. The one or more non-transitory, computer readable storage media of claim 11, wherein to stream the tab content comprises to receive bitmap data indicative of the tab content.

15. The one or more non-transitory, computer readable storage media of claim 11, wherein:
 to stream the tab content comprises to receive serialized drawing commands indicative of the tab content; and
 to render the tab content comprises to deserialize the serialized drawing commands to generate drawing commands.

16. A method for hybrid web execution, the method comprising:
 opening, by a computing device, a secure connection with a cloud server;
 opening, by the computing device, a first browser tab in a web browser of the computing device;
 streaming, by the computing device, tab content for the first browser tab from the cloud server via the secure connection;

rendering, by the computing device, the tab content in the first browser tab; and synchronizing, by the computing device, a session state of the first browser tab with the cloud server via a second secure connection established between a browser extension of the computing device and the cloud server;

wherein streaming the tab content comprises streaming the tab content after synchronizing the session state.

17. The method of claim 16, further comprising:

opening, by the computing device, a second browser tab in the web browser of the computing device; and executing, by the computing device, the second browser tab locally with the computing device.

18. The method of claim 17, further comprising:

determining, by the computing device, a hybrid tab strategy, wherein the hybrid tab strategy indicates whether to execute each browser tab locally with the computing device or with the cloud server;

wherein executing the second browser tab locally comprises executing the second browser tab locally in response to determining the hybrid tab strategy; and wherein streaming the tab content for the first browser tab comprises streaming the tab content for the first browser tab in response to determining the hybrid tab strategy.

* * * * *